United States Patent

[11] 3,600,971

| [72] | Inventors | John Scarvelis<br>Southfield;<br>Dean A. Green, Milford, both of, Mich. |
|---|---|---|
| [21] | Appl. No. | 855,869 |
| [22] | Filed | Sept. 8, 1969 |
| [45] | Patented | Aug. 24, 1971 |
| [73] | Assignee | American Motors Corporation<br>Kenosha, Wis. |

[54] STEERING COLUMN MOUNTING ARRANGEMENT
6 Claims, 7 Drawing Figs.

[52] U.S. Cl. .................................................. 74/492, 280/87 R
[51] Int. Cl. .................................................. B62d 1/18
[50] Field of Search .................................................. 280/87; 74/492, 493; 267/1

[56] References Cited
UNITED STATES PATENTS

| 1,619,980 | 3/1927 | Kelsey ........................... | 280/87 UX |
| 3,468,182 | 9/1969 | Schwartzberg ................ | 74/492 |
| 3,468,183 | 9/1969 | Schwartzberg ................ | 74/492 |
| 3,504,567 | 4/1970 | Ohashi et al. ................. | 74/492 |
| 3,505,897 | 4/1970 | Scheffler et al. .............. | 74/492 |

FOREIGN PATENTS

| 1,092,323 | 11/1960 | Germany ...................... | 74/493 |

Primary Examiner—Kenneth H. Betts
Attorney—Barbee and Latta

ABSTRACT: In a vehicle a mount arrangement having restraint members normally supporting the upper end of a collapsible steering column having a coupling arrangement adapted, on occurrence of a collision impact on the column, in separating the column into independently movable upper and lower columnar sections at a load less than being needed to overcome the restraint members to yield in movement the attached upper columnar section, the yield being had by the members deforming and reforming, without detachment from the column or vehicle, in absorbing the energy of the impact occurring on the steering wheel.

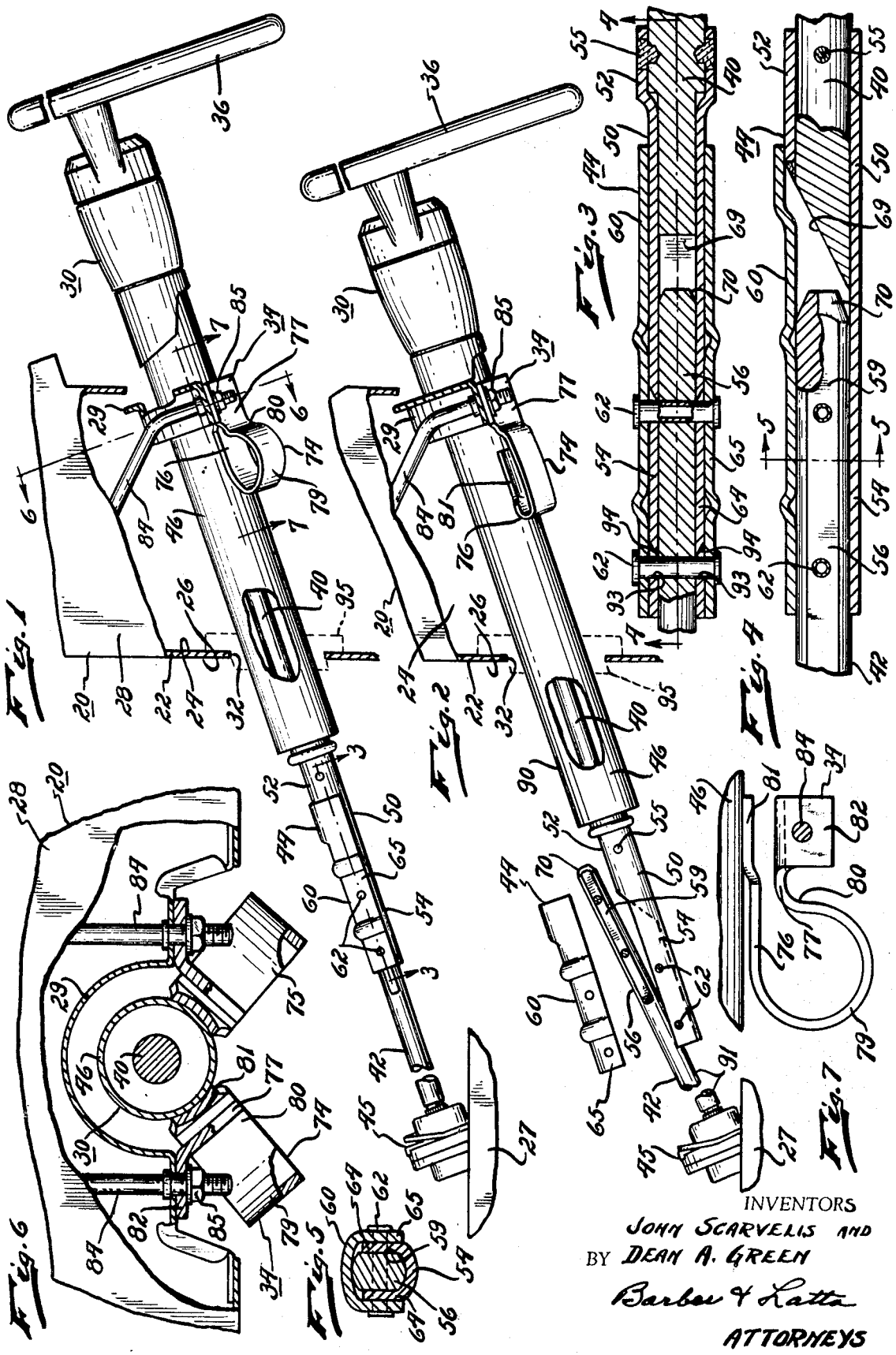

STEERING COLUMN MOUNTING ARRANGEMENT

BACKGROUND OF THE INVENTION

1. Field of the Invention

This invention relates to a vehicular steering column and more particularly to an impact-absorbing steering column including an impact-absorbing mount arrangement for attachment of the column to the vehicle.

2. Description of the Prior Art

There are various known arrangements for collapsing a steering column upon collision impact. One known arrangement includes the telescoping of one section of the column into another with an energy absorbing element therebetween adapted to structurally deform to absorb the kinetic energy applied. Another arrangement couples divided steering rods in drive by a linkage arrangement adapted to be actuated to buckle or draw together the rods ro shorten the column on impact. A more simple arrangement is to rivet the adjacent ends of the shafts together in axial drive alignment arranged to separate upon a shearing of the rivets.

The telescopic arrangement is expensive of manufacture and critical in regard to being collapsed as the impact angularity becomes greater. The other forms sacrifice normal steering operation due to inherent weaknesses and undesirable steering backlash.

It is essential in mounting a steering column in a vehicle to provide an upper mount, adjacent to the steering wheel, which allows the column to yield when impacted on the steering wheel and resist, by serving to bottom the column, to effect the collapse of the column when oppositely impacted. Present known upper mounts effect a yielding by detaching the column from the vehicle by either a slide release arrangement or by shearing the attachment. Such detachment will generally, dependent upon the manner of collapse of the column, cause the upper end of the column to drop by gravity or swing about uncontrollably until the impact energy is spent. As the detachment generally arises from the driver's body falling forwardly on the steering wheel the known arrangements do not fully minimize the vulnerability of the driver to injury.

SUMMARY OF THE INVENTION

The present invention comprises a steering column assembly having a break-apart arrangement and a yieldable mounting arrangement securing the upper end of the column in a vehicle to absorb collision impact energy.

It is an object of the present invention to provide an improved steering column adapted to be collapsed and be controllable in its collapse.

Another object of the present invention is to provide an improved vehicular mount arrangement for a collapsible steering column.

Another object of the present invention is to provide an improved mount arrangement for securement of a collapsible steering column within a passenger compartment of a vehicle and being arranged, in the event of a collision impact to cooperatively effect the collapse of the column, and being further arranged to plastically deform to yield in movement the column directionally with the impact, when impacted on the steering wheel, to absorb the energy of the impact.

A further object of the present invention is to provide in a vehicle an improved mount arrangement for a collapsible steering column assembly being adapted, in the event of a collision impact, to pliably yield the column in movement and continue retaining the column in securement to the vehicle as the energy of the impact is being absorbed.

DESCRIPTION OF THE DRAWING

FIG. 1 is a side elevational view of my improved steering column assembly and mount arrangement therefore being illustrated in a vehicle fragmentarily shown;

FIG. 2 is a view similar to FIG. 1 illustrating the steering column and mount arrangement in a collapsed and deformed configuration as would result from an impact forwardly on the steering wheel;

FIG. 3 is a sectional view taken along line 3—3 of FIG. 1;

FIG. 4 is a sectional view taken along line 4—4 of FIG. 3;

FIG. 5 is a sectional view taken along line 5—5 of FIG. 4;

FIG. 6 is a sectional view taken along line 6—6 of FIG. 1 with a fragmentary showing of the vehicle, and FIG. 7 is a fragmentary view taken along line 7—7 of FIG. 6.

DESCRIPTION OF THE PREFERRED EMBODIMENT

Referring particularly to FIGS. 1 and 2 of the drawing, the present invention is shown in arrangement in an automotive vehicle body designated generally by the numeral 20. The vehicle body conventionally includes a forward firewall structure 22 separating a passenger compartment 24 from a forward compartment 26. The vehicle body 20 also includes structural members 27, 28 of which the structural member 27 extends in the forward compartment 26 and the member 28 extends transversely in the passenger compartment 24 at different horizontal levels, generally as shown. The structural member 28 includes an instrument panel (not shown) and a steering column support portion 29.

The steering column assembly, designated generally by the numeral 30, is arranged to extend diagonally upwardly from the forward compartment 26 into the passenger compartment 24, extending through an opening 32 formed in the firewall structure 22. The lower end of the column assembly is conventionally attached to (not shown) and supported by the structural member 27. Adjacent the upper end of the column assembly is our mounting arrangement, designated in general by the numeral 34, securing the column 30 to the support portion 29.

For clarity purposes the steering column assembly is here shown less the controls generally associated therewith, such as transmission lever control, signal controls, locks and the like. It will be readily apparent that they may be incorporated in the conventional manner and arrangement.

The steering column assembly 30 comprises a steering wheel 36 conventionally secured or keyed (not shown) to the upper end of a first steering rod or shaft 40 for rotation therewith. The opposite end of the shaft is coupled in axial drive alignment by our break apart coupling arrangement, designated as 44, to rotationally drive a second steering rod or shaft 42. The steering rod 42 is in turn operably connected to move a steering sector assembly 45. A portional length of the first steering rod 40 is enclosed and suitably journaled (not shown) within a mast jacket 46 in a well known arrangement for a unitized assembly whereby a longitudinal movement of one will carry therewith the other.

The break apart coupling arrangement 44 comprises a connecting member 50 and a cap member 60. The member 50 being formed having a sleeve section 52 and a U-shaped channel section 54 joined in continuity in longitudinal alignment. Received in the sleeve section 52 is the lower terminal end portion of the shaft 40, being secured therein by welds 55. The upper terminal end portion 56 of the shaft 42 being received and secured in the channel section 54 in a drive interconnection providing a minimum or no backlash and which interconnection may be severed by an impact force above a certain magnitude.

A rotational interlockment of the shaft 42 with the channel section 54 is provided by forming the interfitted end portion 56 with diametrically opposed longitudinally extending planar surfaces or faces 59 in frictional planar contact or abutment, see FIG. 5, with an adjacent vertical side or leg 64 of the channel section 54. The inverted U-shaped cap member 60, preferably of length equal to the length of the channel section, is fitted to cap the open top of the channel section to enclose therein the shaft portion 56. Depending sides or legs 65 of the cap member 60 overlie and frictionally embrace against the adjacent sides of the legs 64. The legs 64, 65 together with the enclosed shaft portion 56 are secured together by shear pins 62. Preferably, each shear pin extends diametrically through the shaft and outwardly therefrom through the opposed legs 64, 65. Upon heading the shear pins the assembly is clampingly secured in manner to provide an efficient drive connection eliminating or reducing backlash to a minimum.

Securement of the shaft 40 within the sleeve section 52 positions the terminal end of the shaft to provide an upper end wall closure for the channel section 54, the end being formed as a ramp or incline 69. Opposed and spaced from the ramp 69 is a conical taper 70 forming the terminal end of shaft 42. In the event of a collision impact on the steering column, there will first occur a shearing of the pins 62 followed by an interengagement of the conical taper 70 with the ramp 69 to direct at least the impacted moving shaft to move laterally outwardly from the other, that is, the end portion 56 of the shaft 42 will move out from the channel section and effect a full separation therefrom to allow the impacted shaft free movement from the other shaft as will be more fully explained hereinafter. It will be obvious that a separate plug insert may, if desired, be secured or formed integrally between the sections to form the incline or ramp described above.

The steering column mounting arrangement 34 comprises a pair of preformed bracket members 74, 75 each interconnecting in securement, in identical manner, the mast jacket 46 to the steering column support portion 29 of the vehicle. It will be apparent that any number of bracket members may be used, as desired, and their orientation about the column being such as will provide a rigid securement and support for the upper end of the steering column to resist the torque generated in the normal use of the steering wheel.

Each member 74, 75, see FIG. 7, is similarly preformed from a predetermined length of flat metal strap or band stock having the characteristics of being rigid in its preformed shape and being pliable to yield or deform on being directly or indirectly impacted as it absorbs the energy thereof. The stock is preformed into a hairpin like arrangement having a pair of legs 76, 77 extending in spaced apart parallel relation. The legs are joined together at one end by an arcuate section 79. The leg 76 is tangentially extended and joined to one end of the arcuate section 79 whose opposite end is joined by a return or reverse bend 80 to the leg 77.

The terminal end 81 of the leg 76 is offset and secured by weld to the outer surface of the mast jacket 46, see FIGS. 6 and 7. In opposed securement is the leg 77 attached to the steering column support 29 by an apertured ear 82 bent and extended outwardly from the leg 77. The ear 82 is received on the threaded end of a hangar bolt 84 projecting downwardly from the support structure 28. A nut 85 threaded on the bolt 84 secures the ear to the support 29.

In the securement of the column assembly to the structure 29 the legs of each member 74, 75 are extended longitudinally to the mast jacket, in spaced relation thereto, in a direction preferably opposite from the steering wheel. In the event of a forward impact on the steering wheel 36, of a predetermined magnitude, the arcuate section will yield to the impact by plastically deforming in an unrollment action. The reduction of the arcuate section reforms as a linear extension to the leg 77. The opposing leg 76 may also transform through the arcuate sections reduction to linearly extending the leg 76 as it moves with the impact to guidingly carry in attachment the column until the energy of the impact is absorbed or spent. Preferably the arcuate section is formed into an unclosed loop with a reverse bend to provide circumferentially a length, which together with the inherent resistance of the material to deformation, will sufficiently guide in linear movement the column to insure absorbing the impact without detachment of either leg from its respective securement.

As the mount arrangement 34 initially yields to the forward impact on the steering wheel a severance or breakage of the coupling arrangement is had, the column assembly separating into an upper and a lower columnar section generally designated by the numerals 90, 91 respectively, see FIG. 2. The impacted upper columnar section 90 being permitted to be guidingly controlled in its movement by the members 74, 75 unrestrained from the lower fixed securement of the column, section 91, to the structure 27. Similarly, in the event of a rearwardly directed impact of predetermined magnitude against the steering sector assembly 45 a like breakage of the coupling 50 is had except, in this instance, the upper columnar section serves to bottom the impact and the lower columnar section 91 is mobile. In the latter event, the arrangement prevents or reduces to a minimum, upward penetration movement of the steering column into the passenger compartment.

The shear strength of the shear pins 62 are set for failure at a load less than that needed for deforming the members 74, 75. On a rearwardly directed impact against the steering sector assembly 45 the shear proceeds from the reaction provided by the upper securement of members 74, 75 to the structure 28 arising through the steering shaft 40 and mast jacket 46 upon which the steering sector assembly 45 and shaft 42 bottoms. For a forwardly directed impact on the steering wheel 36 the shear proceeds from a reaction provided by the lower securement on the structure 27 arising in the sector assembly 45 and shaft 42 upon which latter the shaft 40 and mast jacket 46 bottoms. Upon shearing the pins 62 the cap member 60 is released and deflected, that is, flung off and away as the conical point 70 rides the ramp 69 moving outwardly to direct the shaft 42 laterally away and apart from the channel member 50. The impacted steering shaft or columnar section will pass clear off and alongside the other.

By spacing the conical point 70 from the ramp 69, to prevent bottoming of one shaft against the other, there is insured relative movement to effect the shearing of the pins 62. To further facilitate the shearing action, the openings 93 in legs 64, see FIG. 3, are formed with a knife edge 94 in contact with a respective pin 62. Preferably the knife edge 94 need extend for only a portional part around the edge of the opening.

The deforming action of each member 74, 75, though cooperative, is independent of the other and may vary from the other in accordance with the impact angularity on the steering wheel. The arrangement of the legs of each member will allow lateral guidance of the column, to a limited degree, as well as downward, in the event there occurs a laterally downwardly received impact on the steering wheel.

If desired, a sealing arrangement 95 may be provided in the opening 32 to seal about the steering column to prevent entry of dirt, fumes, etc. from passing therebetween into the passenger compartment 24. The sealing arrangement may be any well known type that frictionally engages about the column in manner not to interfere with the described longitudinal movement of the steering column in the event of a collision impact.

What we claim is:

1. In a motor vehicle, a steering column assembly comprising an upper and a lower columnar section, means operatively interconnecting said sections, said means being adapted upon a collision impact of predetermined magnitude on said column in collapsing axially said column in manner to permit the impacted columnar section thereabove or therebelow movement independently of the other, separate mount means for each of said columnar sections to support said column assembly in said vehicle, at least one of said mount means comprising;

A member having parallel spaced apart leg sections being joined together at one end by an arcuate section;
  Means securing the opposite terminal end of one of said leg sections to one of said steering columnar sections, means securing the terminal end of said other leg section to said vehicle, and said leg sections being arranged to spatially support said attached columnar section in said vehicle; and
  Said member being adapted to deform to an impact loading on said attached columnar section upon said impact being of a magnitude greater than said predetermined magnitude to reform at least said arcuate section substantially to a linear extension to one of said leg sections as said leg section in attachment with said impacted columnar section moves in attachment therewith for controlled guidance thereof.

2. In a motor vehicle of claim 1, comprising;

Said mount means comprising a plurality of members in spaced apart arrangement about said steering column, each member being substantially in like arrangement to cooperatively absorb the energy of an impact to cooperatively provide controlled guidance for the attached impacted section.

3. In a motor vehicle of claim 1, comprising;

Said leg sections being extended from their securement substantially longitudinally relative to said steering column.

4. In a motor vehicle of claim 3, comprising;

Said leg sections being substantially in parallel relation; and

Said arcuate section being of diametrical dimension greater than the spacing of said parallel legs and having one end thereof joined tangentially to one of said legs.

5. In a motor vehicle, a steering column assembly having a coupling arrangement intermediate the ends of said column being adapted to axially fracture said column into separately moveable columnar sections upon either section thereabove or therebelow upon being impacted of a predetermined magnitude, a steering wheel operatively secured to the upper end of said column, a steering column support in said vehicle, means securing said steering column assembly to said steering column support intermediate said coupling arrangement and steering wheel comprising;

A plurality of energy absorbing members arranged in spaced circumferential arrangement about said steering column;

Each of said members having a pair of spaced apart parallel extending leg sections being joined together adjacent one end by an arcuate section;

Means fixedly securing the terminal end of one of said leg sections to said column, means securing the terminal end of said other leg section to said steering column support, and said members each being extended from their securement substantially longitudinally with said column; and Said members each being adapted to deform in a predetermined manner to absorb the energy of an impact on said steering wheel being of a magnitude greater than said predetermined magnitude to cooperatively provide controlled guidance of the attached impacted columnar section.

6. In a motor vehicle of claim 5;

Said arcuate section being tangentially joined to at least one of said leg sections.